RECEIVING SYSTEM FOR RECEIVING SIGNAL INFORMATION USED IN A TIME DIVISION MULTIPLEX SYSTEM

Filed Feb. 21, 1961

INVENTOR
HENRY SCHEFTELOWITZ
BY Hane and Nydick
ATTORNEYS

United States Patent Office 3,126,451

Patented Mar. 24, 1964

3,126,451
RECEIVING SYSTEM FOR RECEIVING SIGNAL INFORMATION USED IN A TIME DIVISION MULTIPLEX SYSTEM

Henry Scheftelowitz, Hagersten, Sweden, assignor to Telefonaktiebolaget L M Ericsson, Stockholm, Sweden, a corporation of Sweden Filed Feb. 21, 1961, Ser. No. 90,719
Claims priority, application Sweden Apr. 25, 1960
1 Claim. (Cl. 179—15)

The present invention relates to a receiving system for transmitting signal information and speech information for a time division multiplex system and more particularly for transmitting signal information and speech information from a transmitting unit to a receiving system including a binary pulse code modulated time division multiplex system with *n* channels displaced in time among themselves, each channel having *m* pulse positions. The information necessary, for instance, for call, trunk signalling, charging and so on is obtained with signal information and the information necessary for the message transmission between the calling subscriber and the called subscriber is obtained with speech information, and for synchronization of the receiving unit with the transmitting unit.

The purpose of the invention is to make it possible to use the channels to the utmost for transmitting the speech information (message information) without neglecting the requirements in respect to the quality and safety of the transmission. The system according to the invention is characterized thereby, that the signalling information is transmitted by similarly positioned pulse positions in all the actual channels every second time when the respective channel appears in the chain of time division multiplex cycles formed by the channels, at which for each channel a predetermined pulse position is used and that synchronization information is transmitted by the same predetermined pulse position in channels determined in advance of the remaining times when the respective channel appears in the chain of time division multiplex cycles.

Figure 1:
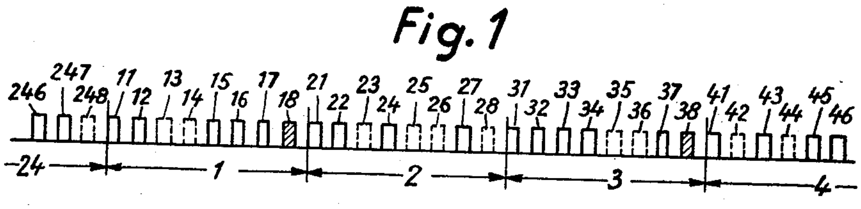
Figure 2:
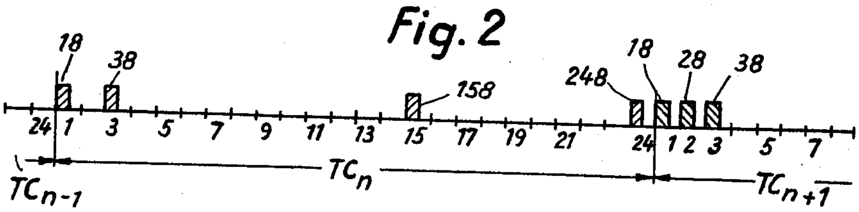
Figure 3:
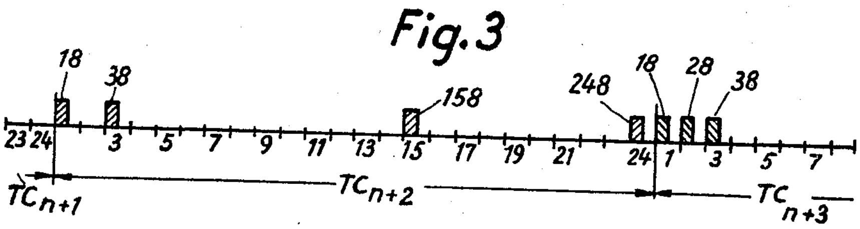
Figure 4:
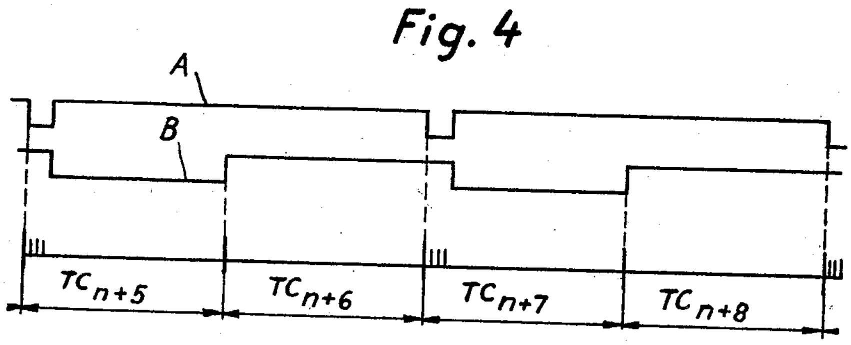

The invention will be further described in connection with the accompanying drawing, in which FIG. 1 shows all the pulse positions of some of the channels in a time division multiplex cycle, FIG. 2 shows the last pulse position of channels in the time division multiplex cycle, FIG. 3 shows the same pulse position as FIG. 2 in the next following time division multiplex cycles, FIG. 4 shows the same pulse position as FIG. 2 in four successive whole time multiplex cycles and a working diagram for two gate circuits and FIG. 5 finally schematically shows how the two gate circuits are integral parts of a receiving unit.

The time division multiplex system schematically shown in FIG. 1 is presumed to have 24 channels displaced in time among themselves, each one with 8 pulse positions. All the pulse positions in the channels 1, 2 and 3 are indicated, but pulses are not present in all the pulse positions. In channel 1, for instance, there are pulses only in the positions 11, 12, 15, 16, 17 and 18, in channel 2 only in the positions 21, 22, 24 and 27 and so on. In the channels 1 and 3 the pulse in the pulse positions 18 and 36 are shaded to indicate that this pulse for the channel in question is used for signalling.

In FIG. 2 the eighth pulse position of all the 24 channels is shown in a time division multiplex cycle $TC_n$ but there are pulses only in the pulse positions 18, 38, 158 and 248 in the channels 1, 3, 15 and 24. It is indicated by the shading that these pulses are used for signalling. In the preceding time division multiplex cycle $TC_{n-1}$ (shown in part only), no pulses are indicated, and in the following time division multiplex cycle $TC_{n+1}$ (also shown in part only) pulses 18, 28 and 38 in the channels 1, 2 and 3 are indicated. These pulses are marked with a different shading to indicate that these pulses are used for synchronization. As may be noted, synchronization pulses are not present in the time division multiplex $TC_n$.

From FIG. 3 it appears that the time division multiplex cycle $TC_{n+2}$ following after $TC_{n+1}$ includes signalling pulses 18, 38, 158 and 248 as well as the cycle $TC_n$ but no synchronization pulses, and that the time division multiplex cycle $TC_{n+3}$ following after $TC_{n+2}$ includes synchronization pulses 18, 28 and 38 as does also the cycle $TC_{n+1}$.

As it is shown evident, the signalling information is transmitted with similarly positioned pulse positions (the eighth) in all the actual channels (the channels 1, 3, 15 and 24 in FIG. 2 and FIG. 3) every second time when the respective channel appears in the chain formed by the channels of time division multiplex cycles (namely the cycles $TC_n$, $TC_{n+2}$ . . . ), a predetermined pulse position (the eighth) being used for each channel.

It appears also that the synchronization information is transmitted with the same predetermined pulse position (the eighth) in channels determined in advance (the first, the second and the third) the remaining times when the respective channel appears in the chain of time division multiplex cycles (namely the cycles $TC_{n+1}$, $TC_{n+3}$ . . .).

Figure 5:
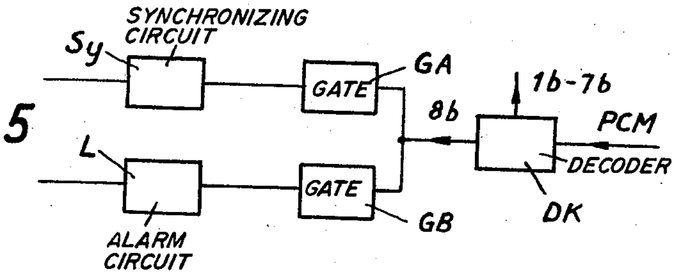

FIG. 5 shows diagrammatically the network of the receiving unit which is most pertinent in this connection. The pulses of all the 24 channels are received as a PCM-signal, which is decoded in the decoding unit DK, in which a separation occurs of the eighth pulse of each channel from the remaining pulses. All these eighth pulses are fed as a signal 8*b* to two gate circuits GA and GB connected in parallel on the input side. Gate circuit GA is used for transmission of synchronization information and will be open only during the time period of the eighth pulse position in the channels 1, 2 and 3 determined in advance that is only during a certain time period in every second time division multiplex cycle. The working diagram A of the gate circuit GA appears from FIG. 4, which shows that the gate circuit GA is closed except during the time periods when the eighth pulse position of the channels 1, 2 and 3 appears in every second time division multiplex cycle. The gate circuit GA is at the output side connected to a synchronization circuit Sy, which is arranged to receive synchronization information and to produce an output signal controlling the synchronization of the receiving unit depending upon if the eighth pulse position of all the three channels 1, 2 and 3 (that is, the channels determined in advance) contains such information. It is obvious that it is possible to select for this purpose a large or a small number of channels which are not necessarily adjacent one to another, provided only that the diagram of the gate circuit GA is correspondingly modified.

The other circuit GB is used for controlling the synchronization information so that such information occurs only during the time period for the eighth pulse position in the channels 1, 2 and 3 determined in advance in every second time division multiplex cycle ($TC_{n+1}$, $TC_{n+3}$ . . .). Gate circuit GB is arranged to be open during the remaining time period (namely the channels 4–24) for the mentioned time division multiplex cycles and closed during the remaining time division multiplex cycles ($TC_n$, $TC_{n+2}$ . . .). This is evident from FIG. 4, which shows the working diagram B of the gate circuit GB. The gate circuit GB is on its output side connected to an alarm circuit L for giving alarm when a synchronization impulse appears in a channel or a pulse position not intended therefore. Closing of the gate circuit during every second time division multiplex cycle (e.g. $TC_{n+6}$, $TC_{n+8}$ . . .) depends upon whether signalling information can occur in the eighth pulse position in any channel, including those which are preoccupied for the purpose of synchronization.

I claim:

In a receiving system for receiving signal information pertaining to receiving messages and for receiving synchronizing information pertaining to synchronizing the receiving system with a transmitting system in a time division multiplex system with *n* channels displaced in time in reference one to another and with *m* pulse positions in each channel, a first gating circuit for transmitting the synchronizing information, said gating circuit being connected and arranged to be open during the entire periods of time for similarly positioned pulse positions in some of the channels every second time said channels appear in the chain of time division multiplex cycles formed by said channels, and a second gating circuit for checking the pulse position of the synchronizing information, said second gating circuit being connected to the input side of the first gating circuit and arranged to be opened during the entire period of time for the remaining channels of the time division multiplex cycles every second time said remaining channels appear.

References Cited in the file of this patent

UNITED STATES PATENTS

| | | |
|---|---|---|
| 2,311,021 | Blumlein | Feb. 16, 1943 |
| 2,744,960 | Greefkes et al. | May 8, 1956 |
| 2,927,965 | Waer | Mar. 8, 1960 |
| 2,949,503 | Andrews et al. | Aug. 16, 1960 |

OTHER REFERENCES

Manley: "Synchronization for the PCM receiver," Bell Labs. Record, February 1949 (pages 62–66 relied upon).